Dec. 3, 1929.　　　　　W. J. MILLER　　　　　1,738,499
APPARATUS FOR PRODUCING MOLD CHARGES OF MOLTEN GLASS
Filed May 27, 1926　　　5 Sheets-Sheet 3

INVENTOR.
William J. Miller
BY Robert S. Brown
ATTORNEY.

Dec. 3, 1929.                W. J. MILLER                1,738,499
APPARATUS FOR PRODUCING MOLD CHARGES OF MOLTEN GLASS
Filed May 27, 1926          5 Sheets-Sheet 5

INVENTOR
William J. Miller
By Robert D. Brown
Attorney

Patented Dec. 3, 1929

1,738,499

UNITED STATES PATENT OFFICE

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE

APPARATUS FOR PRODUCING MOLD CHARGES OF MOLTEN GLASS

Application filed May 27, 1926. Serial No. 111,957.

My present invention comprises a new and improved mechanically operated feeder for supplying mold charges to fabricating machines.

In the accompanying drawings, wherein I have illustrated the best embodiment of the principles of my invention now known to me.

Referring to the drawings, 1 is the bed plate which is preferably a casting horizontally supported in any convenient manner and in spaced relation to the floor, and having erected thereon the refractory walled receptacle 2 which contains and is kept supplied with the molten glass.

The receptacle is provided with a bottom discharge outlet 3 which extends down though the bed plate 1 and is provided with a renewable clay liner. The roof of the receptacle is provided with an opening 4 through which the rigid implement or "plunger" 5 extends toward the outlet. The plunger is periodically moved toward and away from the outlet, thereby controlling the discharge of glass therethrough so as to form the succession of mold charges.

The upper end of the plunger 5 is clamped in a chuck 6 which is in turn fixed to the lower end of a stem 7 which extends up through a loosely fitting sleeve 8. The ends of the bore of the sleeve are countersunk to form seats for antifriction devices such as the ball-bearings 9 interposed between the sleeve and the stem, thus permitting the stem to rotate freely within the sleeve. 10 are upper and lower nuts screwed on threaded portions of the stem above and below the sleeve and holding the ball-bearings in their seats. It is evident that the stem may be adjusted vertically relative to the sleeve by the adjustment of the nuts 10 on the stem 7, thus providing for raising or lowering the plunger in relation to the sleeve and its mounting.

Near its upper end the sleeve 8 is provided with a pair of diametrically opposed trunnion pins 11 which are journaled in bearing holes in a collar 12 which loosely surrounds the sleeve 8. Likewise the collar 12 is provided with a pair of diametrically opposed trunnion pins 13 which are journaled in bearings in the wall of a circular aperture 14 in a horizontally disposed beam 15, the collar loosely fitting in the aperture.

It is thus seen that while the sleeve 8 is free to swing laterally on either the trunnion pins 11 or the trunnion pins 13 as an axis, said sleeve can be moved vertically only in unison with the beam 15.

The beam 15 is provided at either end with a depending sleeve 16, said sleeves being parallel and preferably cast integral with the beam 15. Said sleeves loosely fit and are slidable upon the columns 17, the ends of the sleeve bores being countersunk to receive the bearing-metal bushings 18 which have a sliding fit with the columns and which are held in place by the annular plates 19 bolted to the ends of the sleeves.

The lower ends of the columns 17 extend down into the vertical sleeves 20 of the bed plate 1, being supported therein by the pins 21 which rest on top of the bed plate and extend through diametric holes 22 in the columns, said holes flaring from the center toward each end. It is evident that the angular relation of the columns 17 to the bed plate 1 may be individually adjusted by swinging the columns on their pins 21. The columns are held in their adjusted positions by means of cap plates 23 bearing against the lower ends of the collars 20 and bolts 24 extending through said cap plates and screwed into threaded holes in the lower ends of the columns.

By means of such adjustments the columns 17 may be properly trued with the sleeves 16 so that the latter will slide easily thereon.

The upper ends of the columns 17 are connected together and braced by the cross beam 25 which is provided with split collars 26 which are clamped about the columns. The cross-beam may be adjusted at any desired elevation on the columns.

27 represents a pair of vertically disposed columns rising from the bed plate 1 and clamped in the split collars 28 of the bed plate. 29 represents bearing-blocks provided with split collars 30 by means of which said blocks are clamped on said columns, the elevation of the bearing blocks being adjustable by shifting the blocks on the columns.

31 is a horizontally disposed shaft which is journaled in the bearing-blocks 29. 32 is a lever whose rear end is provided with a split collar 33 by means of which the lever is fixed to the shaft intermediate of the ends of the latter. The lever 32 may be angularly adjusted relative to the shaft by first loosening the bolts of the clamping collar, then rotating the collar on the shaft and then retightening the bolts.

The front end of the lever 32 is bifurcated to straddle the sleeve 8 and the forks of said lever are provided with rollers 34 which engage the beam 15 from below.

It is thus evident hat by rocking the shaft 31 the plunger 5 may be caused to reciprocate toward and away from the outlet 3.

One end of the shaft 31 extends outwardly beyond its bearing and has fixed thereon the crank-arm 35 whose free or front end is bifurcated to embrace the upper end of an internally threaded sleeve 36, a pivot pin 37 extending through the arm and sleeve. The upper threaded end of a connecting rod 38 is screwed into said sleeve and the lower end of said rod is screwed into a second threaded sleeve 39. The threads on the opposite ends of the rod are of opposite pitch so that when the rod is rotated in one direction the sleeves are brought nearer together but when the rod is rotated in the opposite direction the sleeves move away from each other. Thus the effective length of the rod 38 may be adjusted. A hand wheel 40 is fixed on the rod to facilitate its adjustment.

Figures 2, 11, 12, 13:
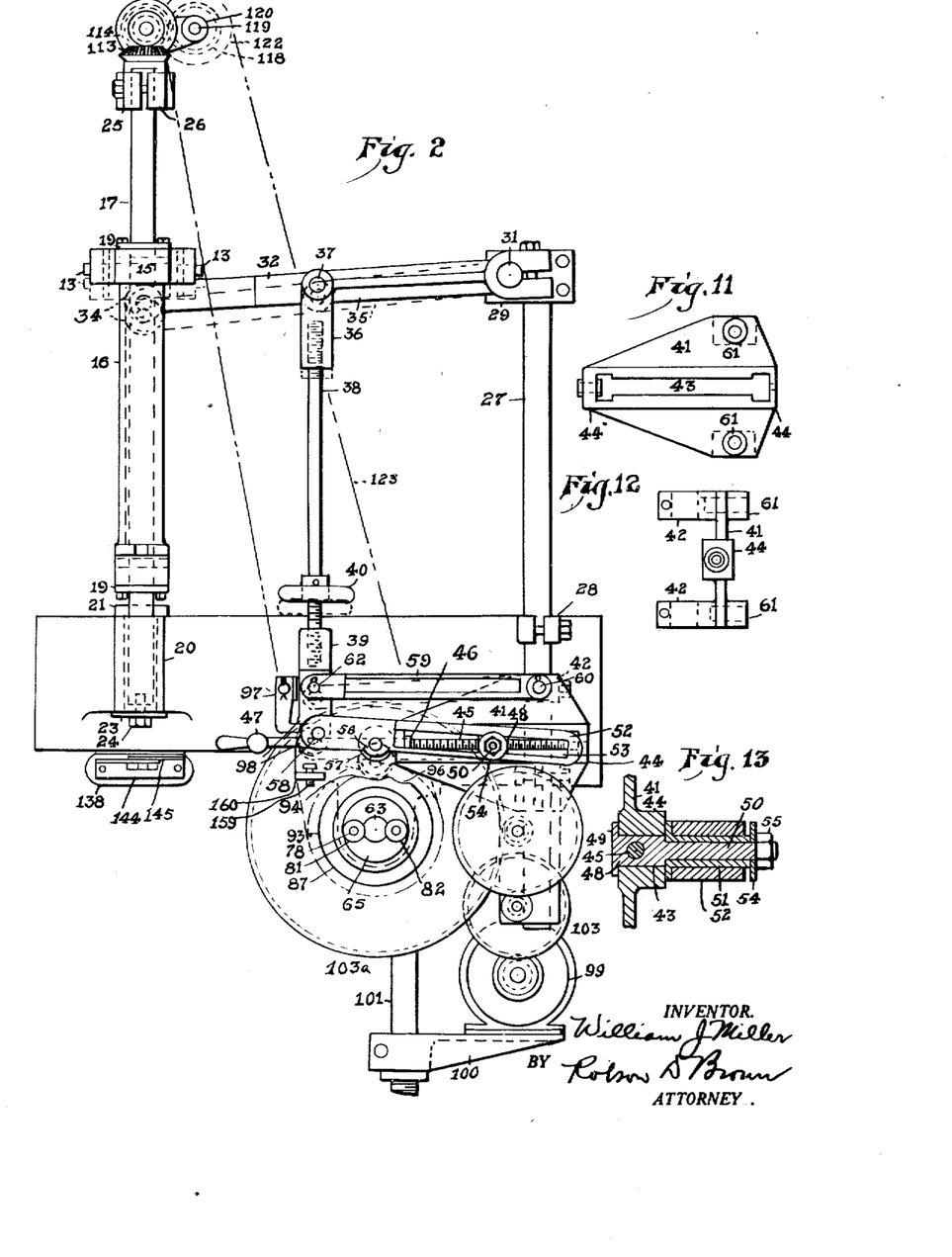
Fig. 2 is a side elevation looking toward the left in Fig. 1.
Fig. 11 is a side elevation of the frame-plate on which are fulcrumed the cam lever and parallel link.
Fig. 12 is a front end view of the same.
Fig. 13 is a sectional detail showing the adjustable pivotal connection between the cam lever and the frame plate.
Figures 3, 6:
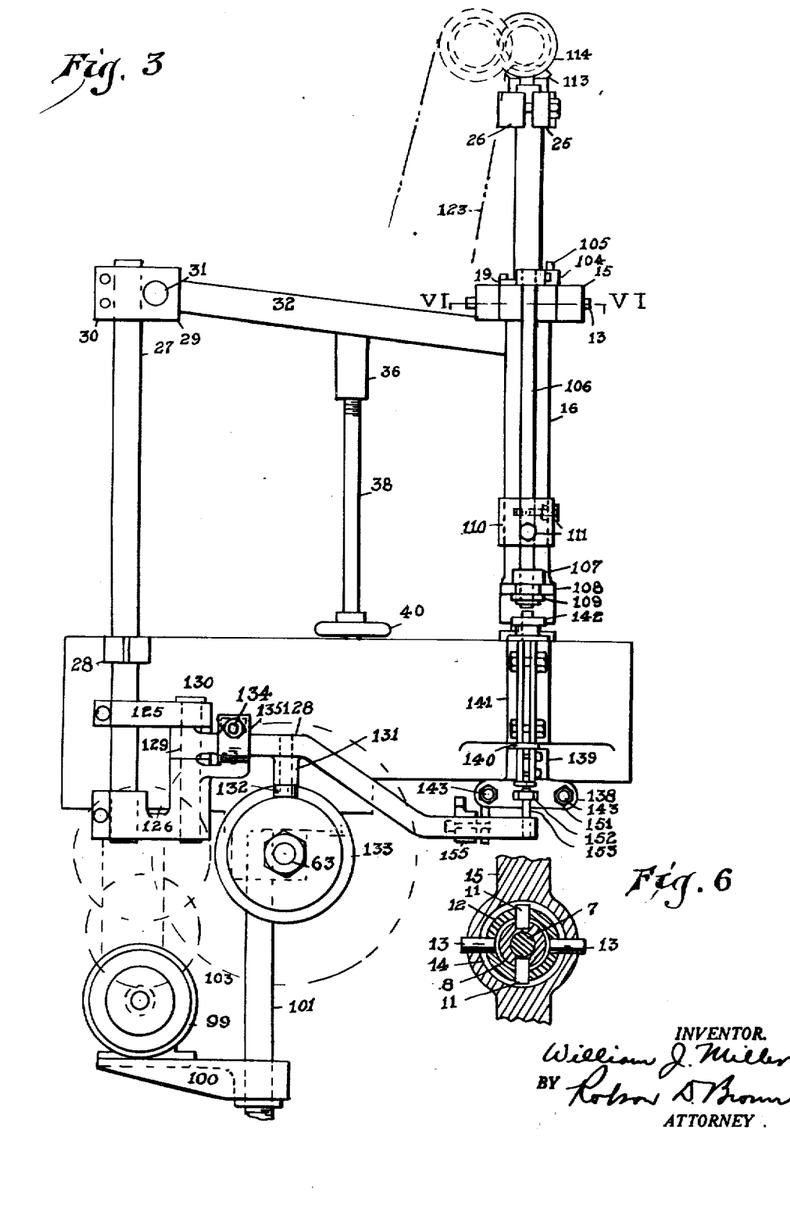
Fig. 3 is also a side elevation but looking toward the right in Fig. 1.
Fig. 6 is a detail in section along the line VI—VI in Fig. 3.
Figure 4:
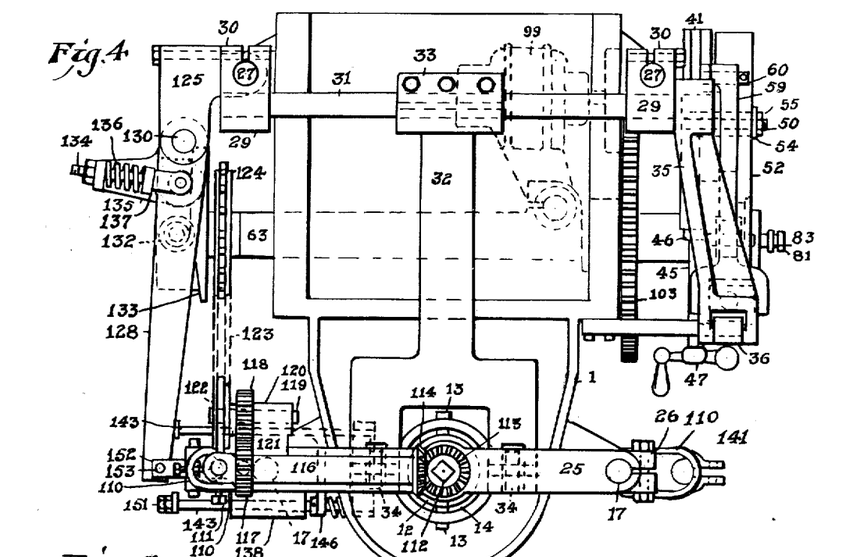
Fig. 4 is a top plan view of the feeder.
Figure 5:
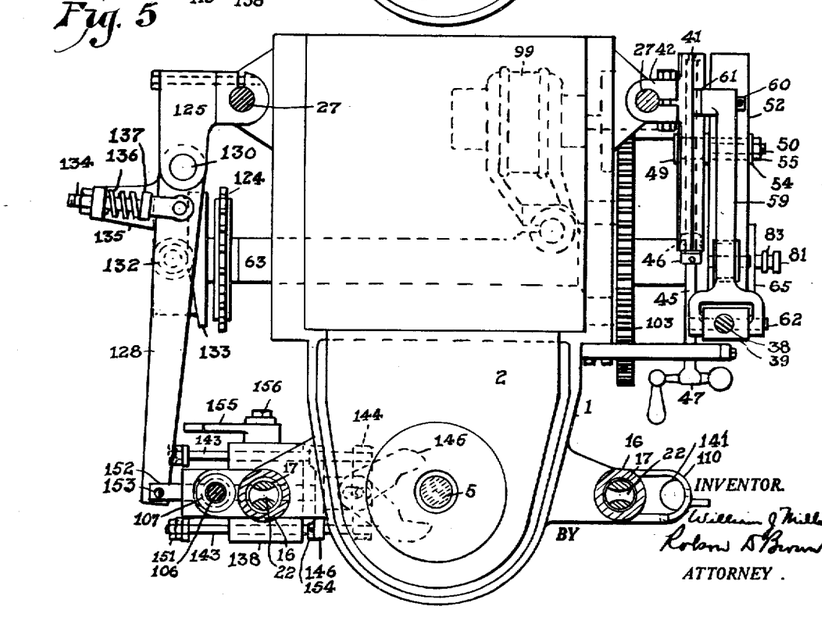
Fig. 5 is a horizontal section of the feeder taken along the irregular line V—V in Fig. 1.

41 is a frame plate, preferably a casting, provided with the upper and lower split collars 42 by means of which it is clamped on the downwardly extended end of one of the columns 27. The plate 41 is provided with a horizontally slotted opening 43 defined by the boxing 44. The slot is enlarged at both ends, as shown in Fig. 11.

45 is a screw shaft extending longitudinally through said slot 43, having its rear end reduced and journaled in a bearing in the rear wall of the boxing while the front end of the shaft is journaled in and extends forwardly through the front wall of the boxing, collars 46 being pinned or otherwise fixed on the shaft on either side of the front wall of the boxing to prevent longitudinal movement of the shaft when rotated.

The front end of the screw shaft 45 is provided with a crank handle 47 so that the shaft may be rotated by hand.

48 is a screw nut engaged on said shaft and slidably mounted in the slot 43 so that when the shaft is rotated the nut will be caused to travel along the slot. The rear end of the nut is provided with a head 49 which prevents its moving forwardly from the slot, but when the screw shaft is removed the nut may be inserted into or removed from the slot at the enlarged ends of the latter, thus providing for convenient assemblage and disassemblage of the parts. 50 is a reduced cylindrical stem integral with or fixed to the nut 48 and extending forwardly and having its outer end threaded. 51 is a cylindrical bushing slipped on said stem, the outwardly flanged head of the bushing bearing on the front of the boxing 44 above and below the slot.

52 is the cam lever provided with a longitudinally slotted opening 53 extending toward its rear end. The lever is mounted on the bushing 51 by the extension of the latter through the slot 53. A washer 54 is placed on the stem 50 against the outer end of the bushing 51 and a nut 55 screwed on the stem against the washer. The lever 52 swings on the bushing 51 as an axis.

Near its front end the lever 52 is provided with depending twin ears 56 between which is journaled the roller 57 which rides on the operating cam. The front end of the lever is bifurcated to embrace the lower end of the sleeve 39 to which it is pivotally connected by a pin 58.

It is evident that the fulcrum point of the lever 52 may be adjusted by loosening the nut 55 and rotating the screw shaft 45 in the proper direction to move the screw nut 48 forwardly or rearwardly relative to the frame plate 41, the bushing sliding along the slot 53 of the lever 52. When the fulcrum point of the lever 52 has been shifted to provide the desired throw for the cam lever, the nut 55 is retightened thus fixing the screw nut 48 relative to the frame plate.

59 is a parallel throw link whose rear end is provided with a collar which is slipped over a horizontal stud 60 extending forwardly from a socket 61 in the frame plate 41. A cotter pin prevents the accidental disengagement of the collar from the pin. The front end of the link 59 is bifurcated to straddle the sleeve 39 to which it is pivotally connected by diametrically opposed pins 62 journaled in bearing holes in the forks of said link.

It will be noticed that the frame plate 41 is symmetrical above and below the horizontal axis, having upper and lower split collars 42 and upper and lower sockets 61, although the upper of the latter only is used. By making the frame plate symmetrical it can be installed at either the right side of the feeder, as shown, or at the left side, as may be more convenient in view of the environment in which the feeder is placed.

The construction of the operating cam is shown in detail in Figs. 7 to 10, inclusive.

Thus 63 is the horizontally disposed drivenshaft, journaled in housing 64 attached to the under side of the bed plate 1. For convenience in assemblage and disassemblage, the hub of the cam is formed of two parts, the front hub-part 65 and the rear hub-part 66, the same being fixed on the shaft, as by the pins 67. The rear hub-part 66 is radially split so that its perimetral surface may be expanded, as will later be more fully described.

The rear hub-part 66 has a differential exterior perimetral surface, the surface of greater diameter 68 being at the rear and that of less diameter 69 toward the front, the radial shoulder 70 separating the two perimetral surfaces.

Likewise the front hub-part 65 has a differential exterior perimetral surface, the surface of larger diameter 71 being at the front and that of lesser diameter 72 at the rear, a shoulder 73 separating said perimetral surfaces. The diameter of the surface 72 of the front hub-part is somewhat less than that of the surface 69 of the rear hub-part so that a shoulder 74 is formed where the hub-parts abut against each other.

The cam-carrier 75 is a ring which is provided with a differential bore, the portion of greater diameter 76 being at the rear and slipping over the perimetral surface 69 of the rear hub-part 66 when the latter is not expanded, and abutting against the shoulder 70. The front portion 77 of the bore of the cam carrier 75 surrounds the perimetral surface 72 of the front hub-part. In assembling the cam-structure, the rear hub-part is first mounted on the shaft and fixed thereto, the cam-carrier is then slipped in place, and then the front hub-part is slipped into place and fixed on the shaft 63.

The bore 77 of the cam-carrier 75 is toothed to provide an internal gear, and unless the hub-part 66 is expanded to wedge the cam-carrier fixedly thereto, the cam carrier is rotatable on the hub. The rear hub-part may be expanded, to fix the cam carrier to the hub, by means of a hand screw 78, which is screwed in a threaded hole 79 in the front hub-part 65 parallel with the axis of the hub, and which has a tapered end extending into the split of the rear hub-part, the walls of said split being provided with opposed arcuate grooves 80 which are engaged by the inner tapered end of the screw to wedge the split apart and thus increase the external diameter of the hub part. The front end of the screw 78 protrudes and is provided with a knob 81 so that it may be grasped and the screw rotated to either expand the rear hub-part or to permit it to contract.

The carrier may be rotated on the hub when the rear hub-part is in its contracted state, by means of a pinion 82 mounted in a socket in the front hub-part and having its rear end reduced and journaled in a bearing in the rear hub-part. The rear portion of the socket is open so that the pinion meshes with the internal gear of the cam-carrier. The front end of the pinion 82 protrudes and is provided with a hand knob 83 by means of which the pinion may be turned to rotate the cam-carrier. The pinion is prevented from accidental outward movement relative to the hub my means of the locking plate 84 slidably held on the end of the shaft 63 by a headed screw 85 which extends through a slot in said plate, the plate being thus slidable outwardly so that its arcuate end will fit against a circular shoulder on the knob 83. The plate is held fixed in its locking position by means of a binding screw 86 which extends through a hole in said plate and may be screwed into a threaded hole in the end of the shaft 63.

Figures 7, 8, 9, 10, 14:
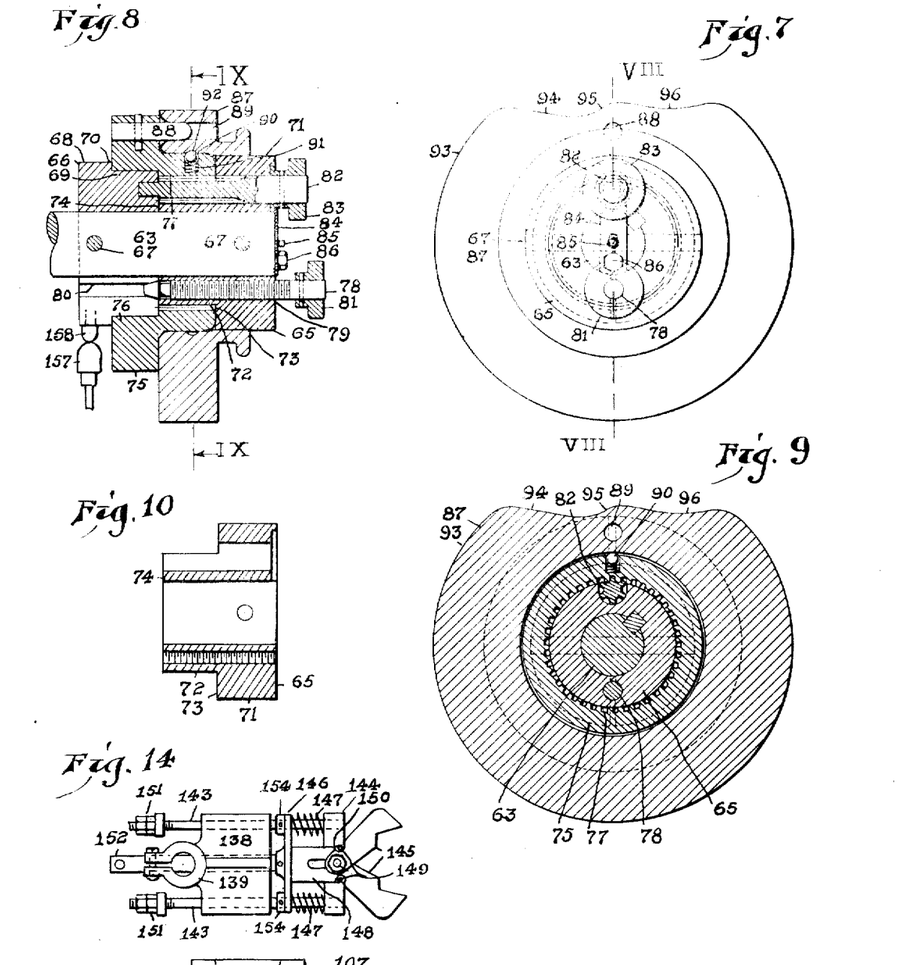
Fig. 7 is a front view of the operating cam shown on enlarged scale.
Fig. 8 is a diametric section thereof taken along the line VIII—VIII in Fig. 7.
Fig. 9 is a section of the cam taken along the line IX—IX in Fig. 8.
Fig. 10 is a diametric section of the front hub member of the cam.
Fig. 14 is a plan view of the shears.
Figure 15:
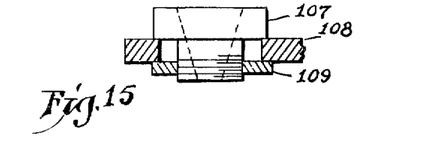
Fig. 15 is a detail in vertical section of the plunger-adjustment cup and its mounting.

The cam 87 is a ring having a cylindrical bore of differential diameter so as to be slipped into place on the cam carrier and on the front hub-part, as shown in Fig. 8, the exterior shoulder of the cam carrier and the interior shoulder of the cam being rounded to facilitate the mounting of the cam ring.

The cam is held against rotation relative to the carrier by means of a dowel pin 88 fixed to the carrier and engaging a hole 89 in the cam. The cam is also held against accidental lateral movement relative to the carrier by means of a ball-detent 90 spring mounted in a socket 91 in the carrier and engaging a socket 92 in the wall of the bore of the cam.

The perimetral surface of the cam 87 is engaged from above by the roller 57, and said perimetral surface is given the eccentricity necessary to provide the desired oscillatory movement of the lever 52 and the consequent movement of the plunger 5 toward and away from the outlet 3.

Thus the cam, which is assumed to be rotated clockwise in the drawings, is provided with a concentric perimetral surface 93 which during its engagement by the roller 57 maintains the plunger in its elevated position. This concentric surface is followed by an eccentric portion 94 which permits the roller to move inwardly toward the axis of the cam, thus lowering the plunger toward and preferably into the discharge outlet, thus accelerating the discharge of the glass and eventually retarding or interrupting the discharge. The perimetral surface 94 is followed by a second eccentric surface 95 of relative steep outward inclination, causing a relatively rapid initial upward movement of the plunger, thus attenuating the neck of the depending gob or mold charge or raising the sheared stub up into the outlet, dependent upon whether the plunger is adjusted to start upward before or after the shears cut. The eccentric portion 95 is followed by a more gradually inclined eccentric portion 96 which merges into the concentric portion 93, thus completing the elevation of the plunger.

The cam rings are interchangeable and thus a cam adapted to produce any desired character of plunger movement may be substituted, by pulling off the cam on the cam carrier and pushing the selected cam into position.

To enable the cam to be changed without interference on the part of the roller and its associated parts, I provide a depending latch 97 pivotally connected at its upper end to the bed plate 1 and having a hooked lower end. The front end of the lever 52 is provided with one or more angular teeth 98, so that the lever may be raised and the latch 97 hooked under one of said teeth, thus holding the plunger and its roller elevated. These teeth may be placed at different elevations on the end of the lever 52, thus enabling the lever 52 to be elevated sufficiently simply to cause the roller to clear the cam to permit the installation of a different cam or the rotation of the cam carrier to adjust the timing, or the lever may be raised sufficiently to raise the plunger 5 out of the molten glass, thus, for instance, enabling a plunger to be removed and a new one substituted. The latch 97 also provides means for suspending the operation of the plunger without requiring the halting of the rotating cam or its shaft. Thus the plunger may be rendered inoperative while the outflow of glass through the discharge outlet of the receptacle continues and the shears are kept in operation.

Figure 1:
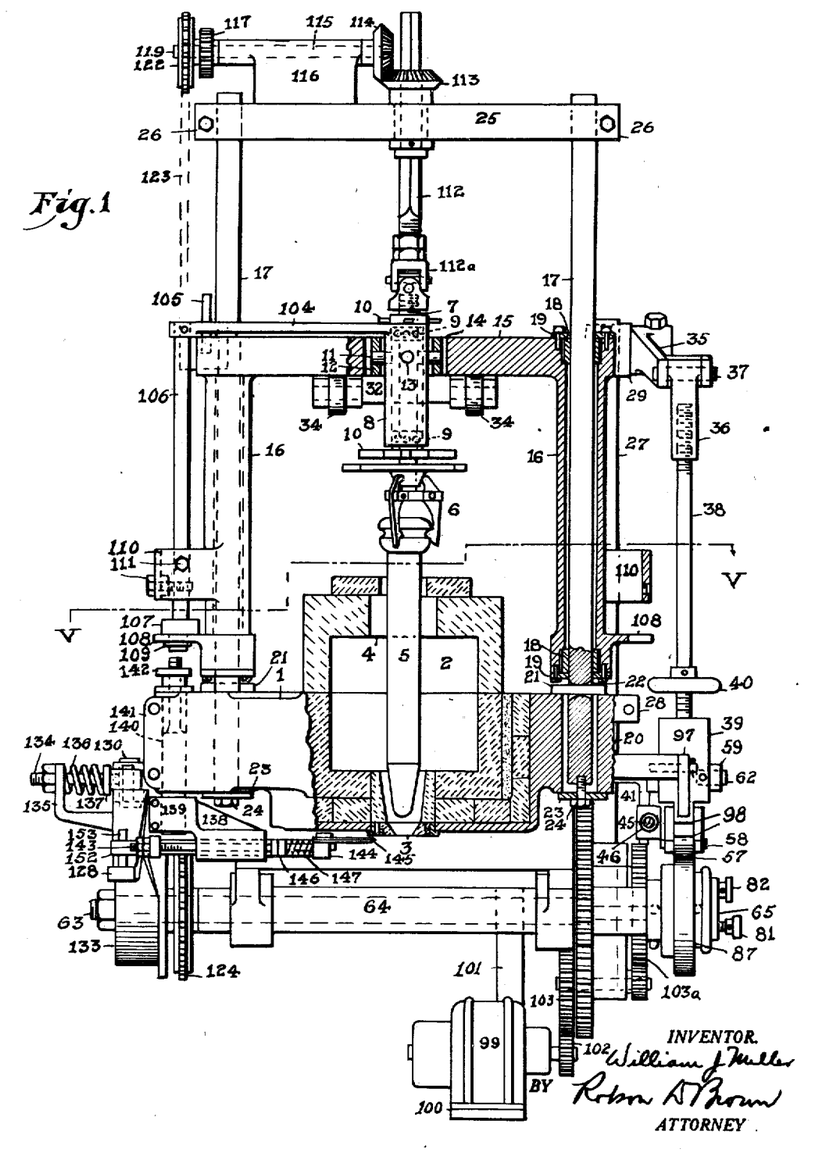
Fig. 1 is a front elevation of the feeder, portions including the feeder receptacle being partially broken away in vertical section for the sake of clearness.

In Fig. 1 in solid lines the latch 97 is shown engaging the upper tooth 98 of the lever 52, thus holding the roller elevated out of contact with the cam. In dotted lines the lever is shown lowered and the roller riding on the cam.

99 is an electric motor which may be mounted on a shelf-support 100 suspended from the bed plate 1, as by being clamped on the depending column 101. The driving shaft of the motor is provided with a pinion 102 which is operatively connected as by the gear train 103 with a gear 103ª on the shaft 63, thus imparting rotary movement to the shaft and to the cam.

104 represents a horizontally disposed arm whose inner end is integral with or rigidly attached to the upper portion of the sleeve 8 and which extends outwardly above the beam 15 to beyond the end thereof. A dowel 105 extending upwardly from the beam 15 loosely fits a hole in said arm.

To the outer end of the arm 104 depends a rigidly attached false plunger rod 106 whose lower end is arranged to bear the same lateral relation to the adjustment cup 107 as does the plunger 5 to the outlet 3 when the plunger is in its low position.

The cup 107 has an open bottom and a downwardly tapered bore corresponding to the taper of the outlet 3, and is mounted on the ring bracket 108 by means of the nut 109 which is screwed on the lower end of the cup up against the bracket. The bore of the bracket is of sufficient diameter to permit lateral adjustment of the cup.

The false plunger 106 depends through a ring-bracket 110 extending from the adjacent sleeve 16, and adjustment bolts 111 extend through holes in said ring and are screwed into threaded holes in the false plunger. Said bolts are positioned at right angles to each other and are provided with collars fixed to the bolts and bearing against the inner wall of the ring to prevent longitudinal movement of the bolt. It is evident that by adjusting the bolts properly the lower end of the false plunger may be adjusted in proper relation to the axis of the adjustment cup.

It is evident that the sleeve 8 and the false plunger will swing in unison, so that an adjustment of the lower end of the false plunger relative to the adjustment cup will effect a like adjustment of the lower end of the plunger 5, when in its low position, relative to the outlet 3.

I provide means for rotating the plunger to prevent stratification of the molten glass in the receptacle 2 and thus insure uniform temperature. Thus I connect the squared shaft 112 to the upper end of the plunger stem 7 by the universal joint 112ª. The shaft 112 is vertically slidable in the squared bore of the hub of a beveled pinion 113 which is rotatably journaled in a vertically disposed bearing extending through the cross-beam 25. Thus the plunger 5 will move toward and away from the outlet, the shaft 112 sliding in the bore of the pinion 113, but the rotation of the pinion will cause the plunger to rotate with the pinion.

In mesh with the pinion 113 is a second beveled pinion 114 on the inner end of a horizontal shaft 115 journaled in the housing 116 mounted on the cross-beam 25. The other end of the shaft is provided with a third pinion 117 meshing with a fourth pinion 118 mounted on a short shaft 119 journaled in a housing 120 supported from the cross-beam 25 by a bracket 121. The shaft 119 is also provided with a sprocket 122 which is connected by a chain 123 with a sprocket 124 on the driven shaft 63. Thus the plunger is simultaneously reciprocated and rotated.

I provide shear mechanism to detach the mold charges depending from the outlet.

I will next describe the shear mechanism.

125 and 126 are a pair of vertically spaced brackets which are clamped to the extended lower end of the other column 27, and 128 is a bent lever having its rear end provided with a vertically disposed hub 129 which is interposed between the brackets 125 and 126 and through which extends the pivot pin 130 carried by said brackets. Said arm is provided near its pivoted end with a depending stud 131 on the lower end of which is carried a roller 132 which engages the cam face of a cam wheel 133 mounted on the shaft 63.

134 is a pin pivotally attached at one end to the lever 128 and having its other end portion slidable in a hole in an angular bracket 135 carried by the bracket 126, and 136 is a helical spring coiled about the pin 134 between the bracket 135 and a shoulder 137 on the pin 134. It is thus seen that the roller 132 will be held in snug engagement with the cam so that the lever will swing in obedience to the irregularities of the front surface of the cam.

138 is a horizontally disposed plate or casting provided with a split collar 139 by means of which it is clamped on a post 140 depending from the bed plate 1. The post extends up into and is clamped in a split collar 141 of said bed plate. The upper end of said post is reduced in diameter to form a threaded stem which extends up through the split collar, a nut 142 being screwed on said stem against the bed plate 1. It is evident that by loosening the split collar and screwing the nut up or down on the stem, the elevation of the casting 138 may be adjusted. After adjustment the collar is again clamped about the post to hold the latter stationary.

The casting 138 is provided with a pair of parallel horizontally disposed bores in which are slidably mounted the shear-rods 143 whose front ends are rigidly connected together by a cross-head 144 upon the center of which are pivotally attached the shear-blades 145. 146 is a second cross head slidably mounted on the rods 143 and 147 represents helical springs coiled about the rods between said cross-heads and normally maintaining the same in spaced relation and automatically returning them to such relation.

The second cross-head is provided with a forwardly extending forked lever 148 provided with upwardly extending pins 149 which work in angularly disposed slots 150 in the shear blades 145, the same being arranged so that the approach of the cross-head 146 toward the cross-head 144 will cause the blades to close for the cutting operation while the retreat of the cross-head 146 from the cross-head 144 causes the shear blades to separate or open.

151 represents limiting nuts screwed on the threaded rear ends of the rods 143 which are employed to limit the forward sliding movement of the rods. By adjusting the nuts on the rods the extent of movement of the rods may be nicely regulated, thus enabling the shears to be properly centered relative to the outlet 3 when they are in their cutting position.

152 represents a link slidably mounted and loosely fitting in the longitudinal opening in the casting 138, the front end of the link being pivotally connected to the second cross-head 146, while the rear end of the link is provided with a circular hole which is engaged from below by a pintle-pin 153 extending upwardly from the front end of the lever 128, the pin being of sufficient length to permit the casting 138 to be raised or lowered, as already described, for the purpose of adjusting the shears vertically relative to the outlet 3.

154 are collars fixed on the rods 143 to limit the retreat of the cross-head 146 on said rods.

It is evident that as the forward end of the lever 128 moves inwardly, the link 152 will cause the cross-head 146 to move forwardly and the springs 147 will cause the cross-head 144 and the rods 143 to move in unison with the cross-head 146 until the limiting nuts 151 engage the rear end of the casting 138, whereupon the cross-head 144 and the shear blades will cease their forward movement. The further advance of the cross-head 146 will result in the pins 149 closing the shears, thus cutting off the mold charge depending from the outlet 3, the nuts 151 being adjusted so that the shear blades are halted in their advance in a properly centered position relative to the orifice. When the front end of the lever 128 moves outwardly, drawing the cross-head 146 rearwardly, the springs 147 will first expand, causing the cross-head to move rearwardly and engage the collars 154, before the cross-head 144 and the rods 143 begin to move, thus causing the shears to first reopen. When the shears have been opened and the cross-head 146 in its retreat picks up the collars 154, then for the remainder of its rearward movement the cross-head 146 carries the opened shears with it, thus withdrawing them from beneath the outlet.

To provide means for holding the shears retracted and inoperative, I provide a stop lever 155 pivotally mounted at its one end on a stud 156 extending horizontally from the casting 138 and adapted to be swung into a horizontal position so as to be imposed in the path of the inward movement of the lever 128 so as to prevent its inward swing.

In Fig. 8 I indicate means whereby another mechanism, such for instance as the fabricating machine to which the mold charges are to be supplied, may be timed by or actuated by the feeder. Thus I show a bleeder-valve 157 positioned in the path of a pin 158 carried by the cam structure. The bleeder valve may be arranged to cause the mold-table rotating mechanism or some other mechanism of the fabricating machine to operate.

It will be seen that the crank-arm 35 may be mounted on either end of the shaft 31; that the frame plate 41 with its cam lever and parallel throw link may likewise be mounted on the lower end of either of the columns 27; the plunger cam may be mounted on either end of the driven-shaft 63 while the cam 133 is mounted on the other end of the said shaft, the brackets 125 and 126, supporting the lever 128, being clamped to the column 27 opposite to the column upon which the frame plate 41 is mounted. Each side of the bed plate 1 is provided with a split collar 139 so that the post 140, which carries the shears may be positioned on the same side of the feeder as the lever 128. Also each of the sleeves 16 is provided with ring brackets 108 and 110, so that the false plunger may be shifted to either side of the machine. The frame plate 41 is symmetrical so that it may be reversed.

This feature of reversibility is important, as the requirements of the glass factory, of the tank or of the location wherein a given feeder is to be installed frequently necessitate the assemblage of the feeder either as shown in the drawings or with the various operating mechanisms reversed as to their positions.

It is evident that my improved feeder is capable of extensive and accurate adjustments.

By means of the false plunger and the adjustment cup, the relation of the plunger in its position nearest to the discharge outlet may be nicely adjusted, it being possible to nicely adjust the relation of the lower end of the plunger to the axis of the discharge outlet, causing the lower end of the plunger to be alined with the axis of the outlet or to be eccentric thereto as may be desired. As the temperature of the glass in the receptacle 2 is usually not uniform on all sides of the outlet, it is frequently found advantageous to shift the lower end of the plunger toward the side of the outlet at which the glass is hottest which is usually the tank side, thus retarding the outflow of the hotter and more fluid glass.

Again the elevation of the plunger at both its low and high positions may be regulated by adjusting the nuts 10 on the plunger stem 7 above and below the ball-bearings 9 in the ends of the sleeve 8.

Another adjustment of plunger throw may be effected by loosening the split collar 33 and adjusting its position circumferentially of the shaft 31. Likewise the crank-arm 35 may be adjusted on the shaft 31.

The relation between the throw of the crank arm 35 and that of the lever 52 may also be adjusted by varying the effective length of the connecting rod 38.

Different characters of plunger movement may be readily and quickly obtained by the installation of a suitable cam-ring 87.

By a rotary movement of the cam carrier on the hub-parts phase-changes or variations in timing between the operations of the plunger and the shears are made conveniently possible.

By shifting the fulcrum point of the lever 52 the throw of the plunger may be regulated.

One of the striking features of the commercial development of automatic apparatus for producing mold charges of molten glass has been the importance of practical means for adjustment, especially in the feeding of shaped suspended gobs, for which my improved feeder is especially adapted. The shaping of the gobs and their weight are controlled by the variation or adjustment of the operations of the plunger and shears and the timing or relation between such operations, and my improved feeder provides ample and efficient facilities for these purposes.

The elevation of the shears may be regulated by adjusting the elevation of the casting 138.

The low position of the plunger 5 relative to the outlet 3 may be adjusted, entirely independently of the upper position of the plunger, by means of a screw 159 screwed in a bracket 160 fixed to a fixed portion of the machine, the screw being interposed in the downward path of the front end of the lever 52. By adjusting the screw in the bracket, the lever may be stopped in its down movement at any desired point.

What I desire to claim is:—

1. In apparatus for producing a succession of mold charges of molten glass, the combination with a receptacle for the molten glass having a submerged discharge outlet and rigid implement working in the molten glass in relation to the outlet to control the discharge of glass from the outlet, of a crank arm at the end of which the rigid implement is suspended, a rotary cam, a lever oscillated by said cam, operative connection between the lever and the crank arm, and means for adjusting said operative connection.

2. In apparatus for producing a succession of mold charges of molten glass, the combination with a receptacle for the molten glass having a submerged discharge outlet and rigid implement working in the molten glass in relation to the outlet to control the discharge of glass from the outlet, of a crank arm at the end of which the rigid implement is suspended, a rotary cam, a lever oscillated by said cam, a connection between the crank arm and the lever, and means for adjusting the effective length of said connection.

3. In apparatus for producing a succession of mold charges of molten glass, the combination with a receptacle for the molten glass having a submerged discharge outlet and a rigid implement working in the molten glass in relation to the outlet to control the discharge of glass from the outlet, of a rotary cam, a lever oscillated by said cam, a parallel throw link associated with the connection between the rigid implement and said lever, and operative connection between the rigid implement and said lever and link whereby the rotation of the cam moves the rigid implement toward and away from the outlet.

4. In apparatus for producing a succession of mold charges of molten glass, the combination with a receptacle for the molten glass having a submerged discharge outlet and a rigid implement working in the molten glass in relation to the outlet to control the discharge of glass from the outlet, of a rotary cam, a lever oscillated by said cam, a parallel throw link associated with the connection between the rigid implement and said lever, operative connection between the rigid implement and said lever and link whereby the rotation of the cam moves the rigid implement toward and away from the outlet, and means for varying the position of the fulcrum point of the lever.

5. In apparatus for producing a succession of mold charges of molten glass, the combination with a receptacle for the molten glass having a submerged discharge outlet and a rigid implement working in the molten glass in relation to the outlet to control the discharge of glass from the outlet, of a rotary cam, a lever oscillated by said cam, a parallel throw link associated with the connection between the rigid implement and said lever, operative connection between the rigid implement and said lever and link whereby the rotation of the cam moves the rigid implement toward and away from the outlet, and means for varying the throw of said lever.

6. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, and means convenient to the hands of the operator for adjusting said angularity, said means including an indicator corresponding to the implement and a cup corresponding to the outlet.

7. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, and means convenient to the hands of the operator for adjusting said angularity, said means including an indicator corresponding to the implement and moving therewith on the flexible joint and a cup corresponding to the discharge outlet.

8. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, and means convenient to the hands of the operator for adjusting said angularity, said means including an indicator moving in unison with the implement on the flexible joint and a cup bearing the same relation to the indicator as the discharge outlet bears to the plunger when the latter is in its low position.

9. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, and means convenient to the hands of the operator for adjusting said angularity, said means comprising a cup and an element moving with the implement on the flexible joint and maintaining the same relation to the cup as does the implement when in its low position to the discharge outlet.

10. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, means convenient to the hands of the operator for adjusting said angularity, said means including an indicator moving in unison with the implement on the flexible joint and a cup bearing the same relation to the indicator as the discharge outlet bears to the plunger when the latter is in its low position, and means for maintaining the adjusted relation.

11. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a support movable up and down in a substantially vertical path and from which the implement depends, a flexible joint connection between the implement and the support whereby the angularity of the implement relative to the support may be varied to adjust the relation of the lower end of the implement to the discharge outlet when the implement is in its low position, means convenient to the hands of the operator for adjusting said angularity, said means comprising a cup and an element moving with the implement on the flexible joint and maintaining the same relation to the cup as does the implement when in its low position to the discharge outlet, and means for maintaining the adjusted relation.

12. In apparatus for producing a succession of mold charges of molten glass, the combination of a receptacle for the molten glass provided with a submerged discharge outlet and a rigid implement working in the molten glass in relation to the outlet to control the discharge of the glass from the outlet, of a support movable toward and away from the outlet, a sleeve having a universal joint connection with said support, the upper extension of said implement being rotatably journaled in said sleeve, and means for preventing relative longitudinal movement between said sleeve and said implement.

13. In apparatus for producing a succession of mold charges of molten glass, the combination of a receptacle for the molten glass provided with a submerged discharge outlet and a rigid implement working in the molten glass in relation to the outlet to control the discharge of the glass from the outlet, of a support movable toward and away from the outlet, a sleeve having a universal joint connection with said support, the upper extension of the implement being journaled for rotation in said sleeve, and means for adjusting the implement longitudinally of the sleeve and for securing it in its adjusted position.

14. In apparatus for producing a succession of mold charges of molten glass, the combination with a receptacle for the molten glass provided with a submerged discharge outlet and a rigid implement working in the molten glass in relation to the outlet to control the discharge of the glass from the outlet, of a pair of upwardly extending columns, a support slidably mounted on said columns, the implement being suspended from the support and being rotatable relative thereto, means for raising and lowering the support to move the implement toward and away from the outlet, a driven pinion, and a shaft flexibly connected to said implement and slidably engaging the bore of said pinion so as to be rotated thereby.

15. In apparatus for producing a succession of mold charges, the combination with a receptacle for the molten glass having a submerged discharge outlet and a rigid implement working in the glass to control the discharge of glass from the outlet, of a pair of columns, a stationary support carried by the columns, a movable support slidably mounted on the columns below the stationary support, the rigid implement being carried by said movable support and arranged for rotation relative thereto, means for periodically raising and lowering said movable support, and a rotator mounted on said stationary support, an upward extension of said rigid implement slidably engaging said rotator so that said rigid implement is rotated.

16. In apparatus for producing a succession of mold charges, the combination with a receptacle for the molten glass having a submerged discharge outlet and a rigid implement working in the glass to control the discharge of glass from the outlet, of a pair of columns, a stationary support carried by the columns, a movable support slidably mounted on the columns below the stationary support, the rigid implement being carried by said movable support and arranged for rotation relative thereto, means for periodically raising and lowering said movable support, and a rotator mounted on said stationary support, an upward extension of said rigid implement slidably engaging the bore of said rotator whereby said rigid implement is rotated.

17. In apparatus for producing a succession of mold charges, the combination with a receptacle for the molten glass having a submerged discharge outlet and a rigid implement working in the glass to control the discharge of glass from the outlet, of a pair of columns, a stationary support carried by the columns, a movable support slidably mounted on the columns below the stationary support, the rigid implement being carried by said movable support and arranged for rotation relative thereto, means for periodically raising and lowering said movable support, and means carried by said stationary support for rotating said implement.

18. In apparatus for producing a succession of mold charges of molten glass, the combination with a receptacle for the molten glass provided with a submerged discharge outlet and a rigid implement working in the glass in relation to the outlet to control the discharge of glass from the outlet, of upwardly extending guide means, a support slidably mounted on said guide means, the rigid implement depending from said support, an oscillating lever engaging said support, a connecting rod having its upper end operatively connected to said oscillating lever, a second lever mounted to oscillate to which the lower end of said connecting rod is connected, a rotary cam oscillating said second lever, and means for adjusting the effective length of said connecting rod.

19. In apparatus for producing a succession of mold charges of molten glass, the combination of a receptacle for the molten glass provided with a submerged discharge outlet and a rigid implement working in the glass in relation to the outlet to control the discharge of glass from the outlet, of a support movable toward and away from the outlet, said support being provided with an aperture, an annular collar mounted in said aperture to swing on a horizontal axis, a member extending through said collar and mounted therein to swing on a horizontal axis at right angles to the axis of the collar's movement and means for suspending the implement from said member.

20. In apparatus for producing a succession of mold charges of molten glass, the combination of a receptacle for the molten glass provided with a submerged discharge outlet and a rigid implement working in the glass in relation to the outlet to control the discharge of glass from the outlet, of a support movable toward and away from the outlet, said support being provided with an aperture, an annular collar mounted in said aperture to swing on a horizontal axis, a member extending through said collar and mounted therein to swing on a horizontal axis at right angles to the axis of the collar's movement, and means for suspending the implement from said member, said means being arranged to permit the rotation of the implement relative to the member.

21. In apparatus for producing a succession of mold charges of molten glass, the combination of a receptacle for the molten glass provided with a submerged discharge outlet and a rigid implement working in the glass in relation to the outlet to control the discharge of glass from the outlet, of a support movable toward and away from the outlet, said support being provided with an aperture, an annular collar mounted in said aperture to swing on a horizontal axis, a member extending through said collar and mounted therein to swing on a horizontal axis at right angles to the axis of the collar's movement, and means for suspending the implement from said member, said means being arranged to permit the raising or lowering of the implement relative to said member.

22. In apparatus for producing a succession of mold charges of molten glass, the combination of a receptacle for the molten glass provided with a submerged discharge outlet and a rigid element working in the glass in relation to the outlet to control the discharge of glass from the outlet, of a support movable toward and away from the outlet, said support being provided with an aperture, an annular collar mounted in said aperture to swing on a horizontal axis, a member extending through said collar and mounted therein to swing on a horizontal axis at right angles to the axis of the collar's movement, and means for suspending the implement from said member, said means being arranged to permit the raising and lowering of the implement relative to the member and the rotation of the implement relative to the member.

23. In apparatus for producing a succession of mold charges of molten glass, the combination with a receptacle for the molten glass provided with a submerged discharge outlet, of a pair of coacting shear blades disposed below said outlet, a support for said shear blades provided with an upwardly extending post, a collar on the receptacle structure into which said post extends, means for raising and lowering said post in said collar to adjust the elevation of the shear blades relative to the outlet, and means for fixing the post in the collar.

24. In apparatus for producing a succession of mold charges of molten glass, the combination with a receptacle for the molten glass provided with a submerged discharge outlet, of a pair of coacting shear blades disposed below said outlet, a support for said shear blades provided with an upwardly extending post, a split collar on the receptacle structure into which the post extends, means for raising and lowering said post relative to said collar to adjust the elevation of the shear blades relative to the outlet, and means for clamping the collar about the post to fix the post in the collar.

Signed at Pittsburgh, Pa., this 17th day of May, 1926.

WILLIAM J. MILLER.

CERTIFICATE OF CORRECTION.

Patent No. 1,738,499.  Granted December 3, 1929, to

WILLIAM J. MILLER.

It is hereby certified that error appears in the printed specification of the above numbered patent requiring correction as follows: Page 9, line 103, claim 22, for the word "element" read "implement"; and that the said Letters Patent should be read with this correction therein that the same may conform to the record of the case in the Patent Office.

Signed and sealed this 29th day of April, A. D. 1930.

(Seal)

M. J. Moore,
Acting Commissioner of Patents.

relative to the outlet, and means for fixing the post in the collar.

24. In apparatus for producing a succession of mold charges of molten glass, the combination with a receptacle for the molten glass provided with a submerged discharge outlet, of a pair of coacting shear blades disposed below said outlet, a support for said shear blades provided with an upwardly extending post, a split collar on the receptacle structure into which the post extends, means for raising and lowering said post relative to said collar to adjust the elevation of the shear blades relative to the outlet, and means for clamping the collar about the post to fix the post in the collar.

Signed at Pittsburgh, Pa., this 17th day of May, 1926.

WILLIAM J. MILLER.

CERTIFICATE OF CORRECTION.

Patent No. 1,738,499.  Granted December 3, 1929, to

WILLIAM J. MILLER.

It is hereby certified that error appears in the printed specification of the above numbered patent requiring correction as follows: Page 9, line 103, claim 22, for the word "element" read "implement"; and that the said Letters Patent should be read with this correction therein that the same may conform to the record of the case in the Patent Office.

Signed and sealed this 29th day of April, A. D. 1930.

(Seal)

M. J. Moore,
Acting Commissioner of Patents.